United States Patent
Nishiguchi et al.

(10) Patent No.: US 8,379,139 B2
(45) Date of Patent: Feb. 19, 2013

(54) FOCUS CONTROL APPARATUS USEFUL FOR IMAGE PICK UP APPARATUSES EQUIPPED WITH AN AUTO FOCUS FUNCTION AND METHOD THEREFOR

(75) Inventors: Tomoaki Nishiguchi, Yokohama (JP); Hideharu Oono, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/316,653

(22) Filed: Dec. 12, 2011

(65) Prior Publication Data

US 2012/0081597 A1    Apr. 5, 2012

Related U.S. Application Data

(63) Continuation of application No. 12/359,398, filed on Jan. 26, 2009, now Pat. No. 8,120,698.

(30) Foreign Application Priority Data

Feb. 7, 2008   (JP) ................................ 2008-028075

(51) Int. Cl.
*H04N 5/232* (2006.01)
*G03B 13/00* (2006.01)

(52) U.S. Cl. .................. 348/355; 348/353; 348/356

(58) Field of Classification Search .................. 348/345, 348/359, 353, 354, 355, 356
See application file for complete search history.

(56) References Cited

U.S. PATENT DOCUMENTS

| 4,922,346 | A | 5/1990 | Hidaka et al. |
| 5,614,951 | A | 3/1997 | Lee et al. |
| 7,973,852 | B2 * | 7/2011 | Ito et al. .................. 348/349 |
| 2006/0222353 | A1 | 10/2006 | Moriya |
| 2008/0002033 | A1 * | 1/2008 | Ito et al. .................. 348/211.99 |
| 2008/0012977 | A1 * | 1/2008 | Ito et al. .................. 348/345 |

FOREIGN PATENT DOCUMENTS

| JP | 04-318772 | 11/1992 |
| JP | 07-318795 | 12/1995 |
| JP | 09-133854 | 5/1997 |
| JP | 10-239581 | 9/1998 |
| JP | 11-261877 | 9/1999 |
| JP | 3079622 | 6/2000 |
| JP | 2006-64970 | 3/2006 |
| JP | 2006-215105 | 8/2006 |
| JP | 2006-215284 | 8/2006 |

OTHER PUBLICATIONS

Office Action issued in Japanese Patent Application No. 2008-028075 on Jun. 21, 2011.

* cited by examiner

*Primary Examiner* — Nicholas Giles
(74) *Attorney, Agent, or Firm* — Antonelli, Terry, Stout & Kraus, LLP.

(57) ABSTRACT

A focus control apparatus and method capable of shortening a focus adjustment time in focus control. The method includes extracting a first high frequency component depending upon a first cutoff frequency and a second high frequency component depending upon a second cutoff frequency higher than the first cutoff frequency from a video signal, generating first and second contrast signals of the video signal respectively based on the first and second high frequency components, using a quotient obtained by dividing a value of the first contrast signal by that of the second contrast signal as a parameter, exercising focus control based on the parameter, and setting the first and second cutoff frequencies so as to cause a value of the parameter to assume a peak when a focus lens in an image pickup apparatus is located in a position at a predetermined distance from an in-focus position.

20 Claims, 5 Drawing Sheets

FIG. 6

| | | ZOOM MAGNIFICATION | | |
|---|---|---|---|---|
| | | Z1 | Z2 | ..... |
| MOTOR VELOCITY | V1 | f1, f2 = α11, β11 | f1, f2 = α12, β12 | ..... |
| | V2 | f1, f2 = α21, β21 | f1, f2 = α22, β22 | ..... |
| | ⋮ | ⋮ | ⋮ | ⋮ |

30

FOCUS CONTROL APPARATUS USEFUL FOR IMAGE PICK UP APPARATUSES EQUIPPED WITH AN AUTO FOCUS FUNCTION AND METHOD THEREFOR

This application is a continuation of application Ser. No. 12/359,398, filed Jan. 26, 2009 now U.S. Pat. No. 8,120,698, now allowed, which claims the benefit of Japanese application JP2008-028075 filed on Feb. 7, 2008, in the Japanese Patent Office, the disclosures of which are incorporated herein by reference.

BACKGROUND OF THE INVENTION

The present invention relates to a focus control apparatus, and method. The present invention is suitable for, for example, an image pickup apparatus such as a video camera, an electronic still camera and a camera mechanism part of a portable telephone, equipped with an auto focus function.

A large number of conventional image pickup apparatuses such as surveillance cameras and DVD (Digital Versatile Disc) cameras are equipped with the auto focus function to automatically adjust the focus. As a focusing scheme in such an auto focus function, there is a contrast scheme in which focus adjustment is conducted by utilizing the fact that an in-focus state is attained in a position where the amplitude of the contrast signal of a picked up video image is maximized.

In the image pickup apparatus, the picked up video image is brought out of focus or in focus by moving a focus lens in its optical axis direction. As a result, the amplitude of the contrast signal also changes. In the most basic contrast scheme, the focus lens is temporarily moved in its optical axis direction, a direction in which the in-focus state is attained is detected on the basis of whether the amplitude of the contrast signal increases after the movement as compared with before the movement, and the focus lens is moved in that direction.

In JP3079622(B2), JP3338322(B2) and JP4034409(B2), techniques concerning focus control using the contrast scheme are disclosed. A method disclosed in JP-A-7-318795 and JP-A-9-133854 as a focusing processing method using the contrast scheme includes providing a narrow band high frequency band component detector to detect high frequency band components from a video signal and a wide band high frequency band component detector to detect high frequency band components inclusive of frequency components lower in frequency than the high frequency band components, dividing wide band data obtained as a result of the detection from the wide band high frequency band component detector by narrow band data obtained as a result of the detection from the narrow band high frequency band component detector with a microcomputer, regarding a result of the division as a focus evaluation value, and exercising focus control of the image pickup apparatus on the basis of the focus evaluation value.

SUMMARY OF THE INVENTION

In the focusing scheme in the auto focus function described above, it is desired to move the focus lens to an in-focus position as fast as possible. As one method for that purpose, it is considered to increase the travel velocity of the focus lens.

However, the peak of the contrast signal cannot be recognized unless the focus lens goes past the corresponding position (in-focus position). If the travel velocity of the focus lens is increased as described above, therefore, the focus lens goes past the in-focus position greatly, resulting in a problem. If such a situation has occurred, then the focus lens must be moved in the opposite direction again in order to bring the object into focus. This poses a problem that more time is needed accordingly until focusing is attained.

The present invention has been made in view of these circumstances, and an object thereof is to propose a focus control apparatus, and method, which makes it possible to shorten the focus adjustment time at the time of focus control.

In order to achieve the object, the present invention provides a focus control apparatus for exercising focus control in an image pickup apparatus, the focus control apparatus including a first contrast signal generator for extracting a first high frequency component depending upon a first cutoff frequency from a video signal and generating a first contrast signal of the video signal on the basis of the extracted first high frequency component, a second contrast signal generator for extracting a second high frequency component depending upon a second cutoff frequency which is higher than the first cutoff frequency from the video signal and generating a second contrast signal of the video signal on the basis of the extracted second high frequency component, and a controller for using a quotient obtained by dividing a value of the first contrast signal by a value of the second contrast signal as a parameter and exercising focus control on the basis of the parameter, wherein the first and second cutoff frequencies are set so as to cause a value of the parameter to assume a peak when a focus lens in the image pickup apparatus is located in a position which is at a predetermined distance from an in-focus position.

The present invention provides a focus control method for exercising focus control in an image pickup apparatus, the focus control method including a first step of extracting a first high frequency component depending upon a first cutoff frequency from a video signal, generating a first contrast signal of the video signal on the basis of the extracted first high frequency component, extracting a second high frequency component depending upon a second cutoff frequency which is higher than the first cutoff frequency from the video signal, and generating a second contrast signal of the video signal on the basis of the extracted second high frequency component, and a second step of using a quotient obtained by dividing a value of the first contrast signal by a value of the second contrast signal as a parameter and exercising focus control on the basis of the parameter, wherein the first and second cutoff frequencies are set so as to cause a value of the parameter to assume a peak when a focus lens in the image pickup apparatus is located in a position which is at a predetermined distance from an in-focus position.

According to the present invention, it is possible to exercise control so as to decrease the amount by which the focus lens goes past the in-focus position at the time of focus control and shorten the focus adjustment time at the time of focus control.

Other objects, features and advantages of the invention will become apparent from the following description of the embodiments of the invention taken in conjunction with the accompanying drawings.

BRIEF DESCRIPTION OF THE DRAWINGS

FIG. 6 is a table for explaining a cutoff frequency prescription table; and

DETAILED DESCRIPTION OF THE EMBODIMENTS

Hereafter, an embodiment of the present invention will be described in detail with reference to the drawings.

(1) Configuration of Image Pickup Apparatus According to Embodiment

Figure 1:
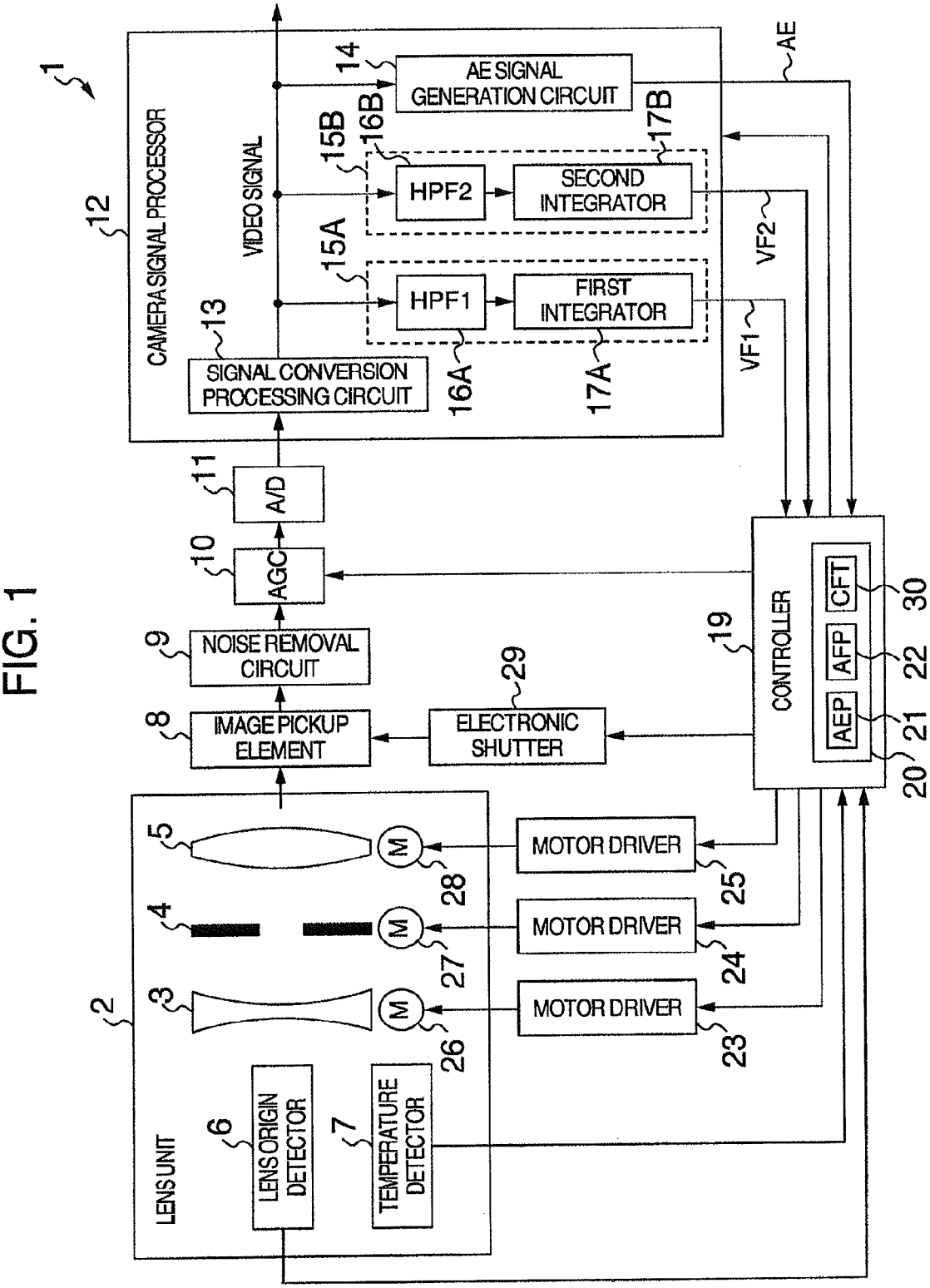
FIG. 1 is a block diagram showing a general configuration of an image pickup apparatus according to an embodiment.

In FIG. 1, reference numeral 1 denotes an image pickup apparatus according to the present embodiment as a whole. In the image pickup apparatus 1, a lens unit 2 includes a variator lens group 3 for varying/multiplying a luminous flux emitted from a subject, an iris 4 for adjusting a receiving light quantity, and a focus lens group 5 having a focus adjustment function. The lens unit 2 forms an optical image of the subject on a light sensing surface of an image pickup element 8 formed of CCDs or the like.

Furthermore, a lens origin detector (or absolute position detector) 6 formed of, for example, photo interrupters, and a temperature detector 7 are provided in the lens unit 2. The lens origin detector 6 detects an origin position of the variator lens group 3, and transmits a result of the detection to a controller 19 as lens origin position detection information. The temperature detector 7 detects a temperature in the lens unit 2, and transmits a result of the detection to the controller 19 as lens unit temperature information.

The image pickup element 8 conducts photoelectric conversion on the optical image of the subject formed on the light sensing surface, and sends a picked up image signal to a noise removal circuit 9. Thereafter, this picked up image signal is subjected to predetermined noise removal processing in the noise removal circuit 9, amplified to an optimum level in an AGC (Automatic Gain Controller) 10, converted to a digital signal in an analog-digital conversion circuit 11, and then supplied to a camera signal processor 12 as a picked up digital image signal.

The camera signal processor 12 conducts predetermined signal processing on a supplied picked up digital image signal in a signal conversion processing circuit 13, thereby converts the picked up digital image signal to a video signal of a standard signal form which conforms to, for example, the NTSC (National Television Standards Committee) standards, the PAL (Phase Alternating Line) standards or the like, and outputs the resultant video signal to the external. The camera signal processor 12 generates an auto iris signal AE having a signal level according to the present brightness of the picked up video, the opening degree of the iris 4 in the lens unit 2, and the gain in the automatic gain control on the basis of the video signal, in an auto iris signal generation circuit 14, and sends the auto iris signal AE to the controller 19.

Figure 2:
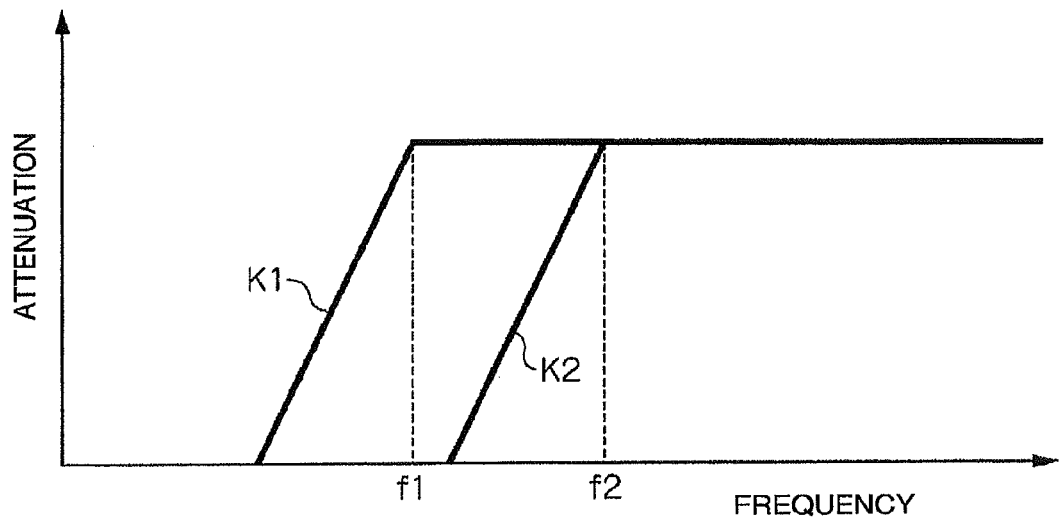
FIG. 2 is a characteristic curve diagram for explaining cutoff frequencies of first and second high-pass filter circuits.

The camera signal processor 12 further includes a first contrast signal generator 15A which in turn includes a first high-pass filter circuit 16A and a first integrator 17A, and a second contrast signal generator 15B which in turn includes a second high-pass filter circuit 16B and a second integrator 17B. In this case, a cutoff frequency f2 of the second high-pass filter circuit 16B is set so as to be higher than a cutoff frequency f1 of the first high-pass filter circuit 16A as represented by K2 and K1 in FIG. 2. The first and second high-pass filter circuits 16A and 16B are made to respectively have cutoff frequencies f1 and f2 which can be changed freely.

Figure 3:
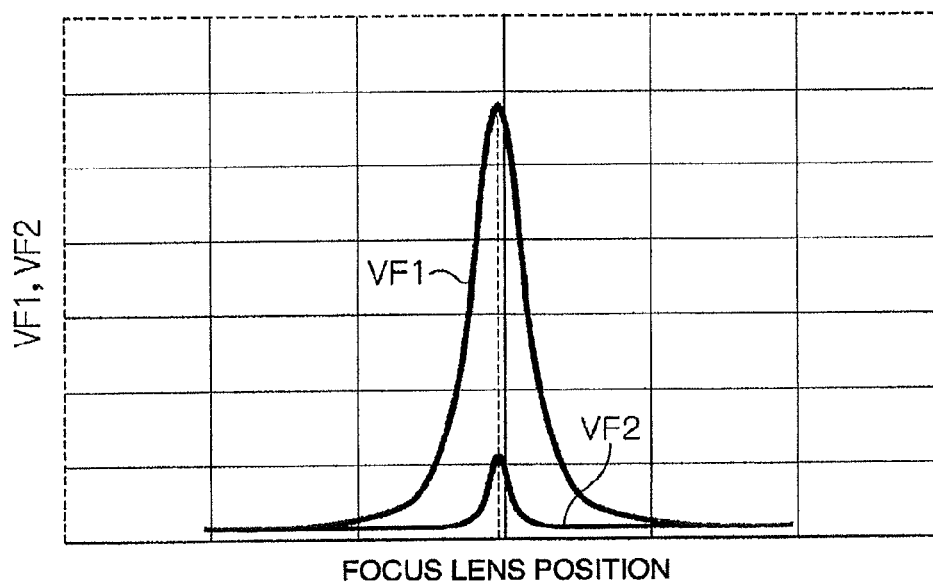
FIG. 3 is a characteristic curve diagram showing relations between a position of a focus lens group and signal levels of first and second contrast signals.

The camera signal processor 12 extracts a high frequency component of a luminance signal in the video signal generated by the signal conversion processing circuit 13, via the first high-pass filter circuit 16A, conducts integration processing on the high frequency component of the luminance signal in the first integrator 17A, and thereby generates a first contrast signal VF1 shown in FIG. 3. Furthermore, The camera signal processor 12 extracts a high frequency component of the luminance signal via the second high-pass filter circuit 16B, conducts integration processing on the high frequency component of the luminance signal in the second integrator 17B, and thereby generates a second contrast signal VF2 shown in FIG. 3. And the camera signal processor 12 sends the first and second contrast signals VF1 and VF2 thus obtained to the controller 19.

The controller 19 includes a CPU (Central Processing Unit) and information processing resources such as an internal memory 20. The controller 19 calculates an auto iris evaluation value, which is an evaluation value for the present brightness of the picked up video, the opening degree of the iris 4 in the lens unit 2, and the gain in the automatic gain control recognized from the auto iris signal AE, on the basis of an auto iris data processing program (AEP) and an auto focus data processing program (AFP) 22, and acquires an auto focus evaluation value which is a value of the first contrast signal VF1 or the second contrast signal VF2.

When the focus lens group 5 in the lens unit 2 is at a predetermined distance or more from the in-focus position, the controller 19 acquires the auto focus evaluation value on the basis of the first contrast signal VF1. On the other hand, when the focus lens group 5 is within the predetermined distance from the in-focus position, the controller 19 acquires the auto focus evaluation value on the basis of the second contrast signal VF1. Therefore, the first contrast signal VF1 is used in coarse adjustment of the auto focus control, whereas the second contrast signal VF2 is used in fine adjustment of the auto focus control.

When, for example, a zoom button which is provided in the image pickup apparatus 1 and which is not illustrated is manipulated, the controller 19 generates a first motor control signal in response to that and sends the first motor control signal to a first motor driver circuit 23. Thus, the first motor driver circuit 23 drives a first motor 26 on the basis of the first motor control signal and thereby moves the variator lens group 3 in its optical axis direction. As a result, a zoom magnification is changed to a value depending on the manipulation of the zoom button.

At this time, the controller 19 generates zoom magnification information which represents the present zoom magnification, on the basis of lens origin position detection information supplied from the lens origin detector 6 in the lens unit 2 and angle information which represents a rotation angle of an output shaft of the first motor 26 supplied from a rotary encoder which is provided on the first motor 26 and which is not illustrated. In addition, the controller 19 generates a third motor control signal on the basis of the zoom magnification information, the auto focus evaluation value, and the lens unit temperature information supplied from the temperature detector 7, and sends the third motor control signal to a third motor driver circuit 25. Thus, the third motor driver circuit 25 drives a third motor 28 on the basis of the third motor control signal and thereby moves the focus lens group 5 in its optical axis direction. As a result, the focus is adjusted according to the change of the zoom magnification (auto focus control).

In addition, the controller 19 generates a second motor control signal on the basis of the auto iris evaluation value, and sends the second motor control signal to a second motor driver circuit 24. Thus, the second motor driver circuit 24 drives a second motor 27 on the basis of the second motor control signal and thereby opens or closes the iris 4 as occasion demands. As a result, the iris is adjusted on the basis of the brightness of the picked up image (auto iris control).

In addition, the controller 19 controls a shutter velocity of an electronic shutter 29 so as to increase or decrease exposure time for the image pickup element 8 on the basis of the auto iris evaluation value, and thereby adjusts the quantity of light of the optical image of the subject formed on the light sensing surface of the image pickup element 8. In addition, the controller 19 adjusts the gain in the automatic gain controller 10 on the basis of the auto iris evaluation value.

(2) Auto Focus Control Scheme in Present Image Pickup Apparatus

Figure 4:
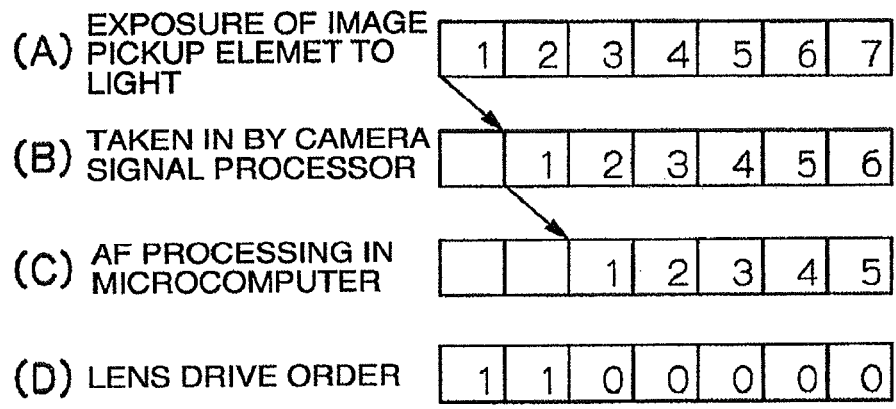
FIG. 4 is a timing diagram for explaining a time difference between timing of exposure of an image pickup element and timing of execution of auto focus control processing based on a result of the exposure.

As shown in FIG. 4, the image pickup element 8 in the image pickup apparatus acquires a picked up video image corresponding to one field (FIG. 4(A)). Then, the camera signal processor 12 generates the first control and second control signals VF1 and VF2 on the basis of the picked up video image (FIG. 4(B)). The controller 19 starts the focus control by using one of the first control and second control signals VF1 and VF2 (FIG. 4(C)). There is a time difference corresponding to, for example, two fields (2/60 second supposing 60 fields per second, which holds true in the ensuing description as well) between the acquisition of the video image and the start of the focus control.

Even if the controller 19 exercised control in the image pickup apparatus so as to stop the travel of the focus lens group 5 in the lens unit 2 immediately after the peak of the first or second contrast signal VF1 or VF2 has been detected, the focus lens group 5 would already go past the in-focus position by a travel distance corresponding to the time of two fields.

If in this case the travel velocity of the focus lens group 5 at the time of focus control is small, then the travel distance of the focus lens group 5 corresponding to the two-field time is not long. If the travel velocity of the focus lens group 5 is made large, however, the travel distance becomes long. Therefore, a long time is required to return the focus lens group 5 to the in-focus position.

Therefore, a quotient obtained by dividing a value (signal level) of the first contrast signal VF1 by a value of the second contrast signal VF2 is introduced as a new parameter (VF1/VF2 which is hereafter referred to as lens position evaluation value VF1 DIV 2). In the present image pickup apparatus 1, the auto focus control is exercised on the basis of the lens position evaluation value VF1 DIV 2.

Figure 5:
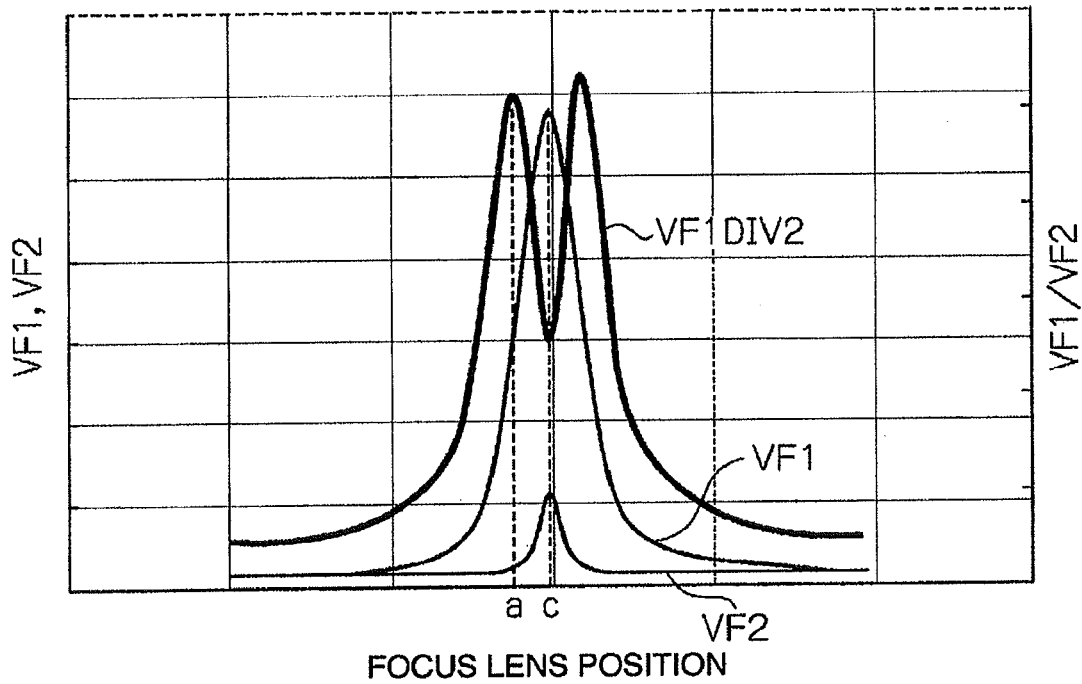
FIG. 5 is a characteristic curve diagram for explaining relations between a focus lens position and a lens position evaluation value.

In other words, the quotient obtained by dividing the value of the first contrast signal VF1 by the value of the second contrast signal VF2 (the lens position evaluation value VF1 DIV 2) assumes a peak in each of a position located a predetermined distance behind the in-focus position and a position located a predetermined distance this side of the in-focus position (i.e., in each of positions located at the predetermined distance from the in-focus position) as shown in FIG. 5. When the focus lens group 5 is located in the in-focus position, the lens position evaluation value VF1 DIV 2 assumes a value smaller than the value of each peak. In an example of the present embodiment, each of the position located the predetermined distance behind the in-focus position or the position located the predetermined distance this side of the in-focus position (i.e., each of positions located at the predetermined distance from the in-focus position) is in the range of approximately 180 to 220 μm from the in-focus position, although it depends upon the cutoff frequency of the high-pass filter and the travel velocity of the focus lens group. If the subject is an ordinary subject such as a chart, a costume or scenery, then the shapes of the first and second contrast signals VF1 and VF2 resemble closely. Therefore, the lens position evaluation value VF1 DIV 2 also takes nearly the same shape regardless of the kind of the subject.

The timing of the lens position evaluation value VF1 DIV 2 assuming a peak varies according to the cutoff frequencies f1 and f2 respectively of the high-pass filter circuits 16A and 16B. Therefore, it is considered that the focus lens group 5 can be stopped in the in-focus position or near the in-focus position on the basis of the lens position evaluation value VF1 DIV 2 by suitably setting relations among the lens position evaluation value VF1 DIV 2 which assumes a peak in each of the position located the predetermined distance behind the in-focus position and the position located the predetermined distance this side of the in-focus position (i.e., in each of positions located at the predetermined distance from the in-focus position), the cutoff frequencies f1 and f2 respectively of the high-pass filter circuits 16A and 16B, and the travel velocity of the focus lens group 5.

Specifically, the cutoff frequencies f1 and f2 respectively of the high-pass filter circuits 16A and 16B should be set so as to satisfy the following equation (1)

$$(c-a)=2v \quad (1)$$

where "a" is a position of the focus lens group 5 where the lens position evaluation value VF1 DIV 2 which assumes a peak, v is a travel distance traveled by the focus lens group 5 in its optical axis direction during one field time (1/60 second), and c is a position of the focus lens group 5 where the first or second contrast signal assumes a peak.

However, the cutoff frequencies f1 and f2 which satisfy the equation (1) differ according to the zoom magnification and the travel velocity (motor velocity) of the focus lens group 5. In the case where it is detected that the focus lens group 5 is located in the in-focus position by using the above-described technique, therefore, it is necessary to acquire the cutoff frequencies f1 and f2 which satisfy the equation (1) for each zoom magnification and each travel velocity of the focus lens group previously by calculations or measurements, retain them as a table, and change the cutoff frequencies f1 and f2 respectively of the first and second high-pass filter circuits according to the zoom magnification and the travel velocity of the focus lens group 5 at that time.

In the case of the image pickup apparatus 1, therefore, a table (hereafter referred to as cutoff frequency prescription table (CFT)) 30 shown in FIG. 6 is formed by previously acquiring the cutoff frequencies f1 and f2 which satisfy the equation (1) for each zoom magnification and each travel velocity of the focus lens group by calculations or measurements and putting them together, and the cutoff frequency prescription table 30 is previously stored in the internal memory 20 in the controller 19.

When moving the focus lens group 5 to the in-focus position at the time of the auto focus control, the controller 19 sets the cutoff frequencies respectively of the first and second high-pass filter circuits 16A and 16B to the frequencies prescribed in the cutoff frequency prescription table 30 on the basis of the zoom magnification and the motor velocity, monitors the lens position evaluation value VF1 DIV 2, controls the third motor driver circuit 25 at the timing of the lens position evaluation value VF1 DIV 2 assuming a peak, and stops travel of the focus lens group 5 so as to prevent the focus lens group 5 from going past the in-focus position largely.

Figure 7:
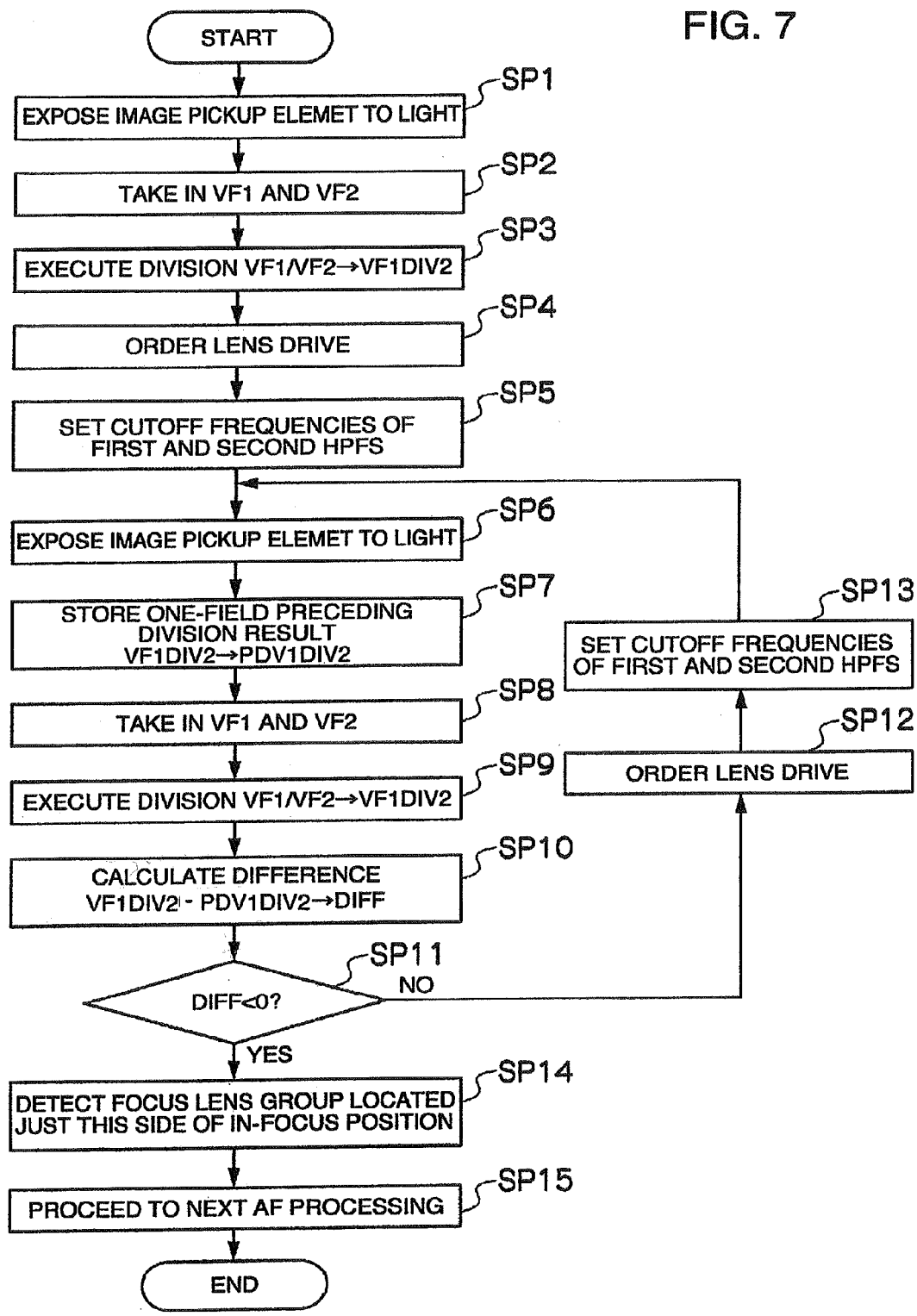
FIG. 7 is a flow chart showing a processing procedure of auto focus control processing according to the embodiment.

FIG. 7 shows concrete processing contents conducted by the controller 19 as regards the auto focus control processing according to the present embodiment. The controller 19 executes the auto focus control processing shown in FIG. 7 on the basis of the auto focus data processing program 22 stored in the internal memory 20.

In other words, when power is thrown in, the controller 19 starts the auto focus control processing. First, the controller 19 drives the electronic shutter 29, thereby exposes the image pickup element to light, and thereby causes a picked up image signal corresponding to one field to be taken in (SP1). Thereafter, the first and second contrast signals VF1 and VF2 supplied from the camera signal processor 12 are taken in (SP2).

Subsequently, the controller 19 executes computation represented by the following equation (2)

$$VF1\ DIV\ 2 = VF1/VF2 \qquad (2)$$

on the basis of the first and second contrast signals VF1 and VF2 taken in at the step SP2, and thereby calculates the lens position evaluation value VF1 DIV 2 (SP3).

Subsequently, the controller 19 generates the third motor control signal on the basis of the auto focus evaluation value obtained at this time, sends the third motor control signal to the third motor driver circuit 25, drives the third motor 28, and thereby moves the focus lens group 5 in its optical axis direction (SP4).

Subsequently, the controller 19 reads out the cutoff frequencies f1 and f2 respectively of the first and second high-pass filter circuits 16A and 16B which should be set at that time from the cutoff frequency prescription table 30, on the basis of the current zoom magnification recognized from the lens absolute position information which is supplied from the lens origin detector 6 in the lens unit 2 and the current motor velocity recognized from the third motor control signal which is sent to the third motor drive circuit 25 at that time. And the controller 19 sets the cutoff frequencies f1 and f2 respectively of the first and second high-pass filter circuits 16A and 16B equal to the frequencies read out at that time (SP5).

If a time period (1/60 second) corresponding to one field elapses since the electronic shutter 29 is driven at the step SP1 and time when a picked up image signal corresponding to the next one field should be taken in is reached, then the controller 19 drives the electronic shutter 29 again and thereby exposes the image pickup element 8 to light (SP6). On the other hand, the controller 19 temporarily stores one-field preceding lens position evaluation value VF1 DIV 2 acquired at the step SP3 into the internal memory 20 as one-field preceding lens position evaluation value PDV1DIV2 (SP7).

Subsequently, the controller 19 takes in the first and second contrast signals VF1 and VF2 supplied from the camera signal processor 12 (SP8). The controller 19 executes computation represented by the equation (2) on the basis of signal levels of the first and second contrast signals VF1 and VF2 taken in, and thereby calculates the lens position evaluation value VF1 DIV 2 in that field (SP9).

And the controller 19 reads out the one-field preceding lens position evaluation value VF1 DIV 2 stored temporarily in the internal memory 20, executes computation represented by the following equation (3)

$$DIFF = VF1\ DIV\ 2 - PDV1\ DIV\ 2 \qquad (3)$$

and thereby calculates a difference value DIFF between the one-field preceding lens position evaluation value PDV1DIV2 and the current lens position evaluation value VF1 DIV 2 (SP10).

Subsequently, the controller 19 makes a decision whether the difference value DIFF calculated at the step SP8 is less than "0" (SP11).

A negative result in this decision means that the lens position evaluation value VF1 DIV 2 has not yet assumed a peak. Thus, at this time, the controller 19 generates the third motor control signal on the basis of the auto focus evaluation value obtained at this time, sends the third motor control signal to the third motor driver circuit 25, and thereby controls the third motor 28 so as to move the focus lens group 5 in the same direction as the direction ordered at the step SP4 as it is (SP12).

The controller 19 sets the cutoff frequencies f1 and f2 respectively of the first and second high-pass filter circuits 16A and 16B to values depending upon the zoom magnification and the motor velocity at that time in the same way as the step SP5 (SP13). Thereafter, the controller 19 returns to the step SP6 and repeats the same processing (SP6 . . . SP11–SP6).

On the other hand, an affirmative result obtained in the decision at the step SP11 means that the lens position evaluation value VF1 DIV 2 has arrived at its peak. At this time, the controller 19 judges the focus lens group 5 to be located just this side of the in-focus position (earlier by a time period corresponding to approximately two fields) (SP14). Then the controller 19 executes fine adjustment of the auto focus control (SP15).

Specifically, if the position of the focus lens group 5 deviates from the in-focus position even after the above-described auto focus control, the controller 19 controls the third motor 13 via the third motor driver circuit 25 while referring to the second control signal VF2 and thereby moves the focus lens group 5 in the direction of the in-focus position. If the focus lens group 5 has gone past the in-focus position, then the controller 19 controls the third motor 28 via the third motor driver circuit 25 again so as to move the focus lens group 5 in the opposite direction. The controller 19 converges the position of the focus lens group 5 upon the in-focus position by repeating such processing. Even if such adjustment of the position of the focus lens group 5 is conducted, the focus lens group 5 does not go past the in-focus position largely at the time of the coarse adjustment (steps SP1 to SP13). As compared with the conventional art, therefore, the fine adjustment can be conducted in a shorter time period.

If the focus lens group 6 is finally located in the in-focus position, then the controller 19 finishes the auto focus control processing.

As heretofore described, in the present image pickup apparatus 1, the cutoff frequencies f1 and f2 respectively of the first and second high-pass circuits 16A and 16B are set so as to cause the lens position evaluation value VF1 DIV 2 to assume a peak when the lens focus group 5 in the lens unit 2 is located in each of a position located a predetermined distance behind the in-focus position and a position located a predetermined distance this side of the in-focus position (i.e., in each of positions located at the predetermined distance from the in-focus position). In addition, at the time of focus control, the lens position evaluation value VF1 DIV 2 is monitored. At the timing of the lens position evaluation value VF1 DIV 2 assuming a peak, the movement of the focus lens group 5 is stopped.

According to the present image pickup apparatus 1, therefore, the focus lens group 5 can be stopped in the in-focus position or near the in-focus position with high precision at the time of auto focus control. As a result, the focus adjustment time at the time of focus control can be shortened.

(3) Other Embodiments

In the above-described embodiment, the case where the present invention is applied to the image pickup apparatus having the configuration shown in FIG. 1 has been described. However, the present invention is not restricted thereto, but the present invention can be applied widely to image pickup apparatuses having various other configurations.

In the above-described embodiment, the case where the cutoff frequencies of the first and second high-pass filter circuits 16A and 16B are set so as to satisfy the equation (1) has been described. However, the present invention is not restricted to this. In short, it is necessary to acquire a picked up video image corresponding to one field by using the image pickup element 8, then generate the first and second contrast signals VF1 and VF2 on the basis of the picked up video image, and set the cutoff frequencies of the first and second high-pass filter circuits 16A and 16B in the controller 19 according to the time difference occurring until the focus control is started, by using one of the first and second contrast signals VF1 and VF2.

In the above-described embodiment, the case where the cutoff frequencies of the first and second high-pass filter circuits 16A and 16B are changed on the basis of both the zoom magnification and the travel velocity of the focus lens (the rotation velocity of the third motor 28) has been described. However, the present invention is not restricted to this. For example, in an image pickup apparatus which is not equipped with the zoom function or an image pickup apparatus having a constant travel velocity of the focus lens, the cutoff frequencies of the first and second high-pass filter circuits 16A and 16B may be changed on the basis of at least one of the zoom magnification and the travel velocity of the focus lens.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A focus control apparatus for exercising focus control in an image pickup apparatus, the focus control apparatus comprising:
    a first contrast signal generator for extracting a first high frequency component depending upon a first cutoff frequency from a video signal and generating a first contrast signal of the video signal on the basis of the extracted first high frequency component;
    a second contrast signal generator for extracting a second high frequency component depending upon a second cutoff frequency which is higher than the first cutoff frequency from the video signal and generating a second contrast signal of the video signal on the basis of the extracted second high frequency component; and
    a controller for using a quotient obtained by dividing a value of the first contrast signal by a value of the second contrast signal as a parameter and exercising focus control on the basis of the parameter,
    wherein the first and second cutoff frequencies are set so as to cause a value of the parameter to assume a peak when a focus lens in the image pickup apparatus is located at positions of a predetermined distance behind an in-focus position and decrease when the focus lens is located behind the peak,
    wherein the predetermined distance is a distance which takes account of an amount of travel of the focus lens during a time difference occurring until the focus control is started in the controller based on the parameter, and
    wherein the focus control is conducted such that, after the focus lens is moved based on the parameter, the focus lens is moved based on a value other than the value of the parameter.

2. The focus control apparatus according to claim 1, wherein the focus control is conducted such that, after a coarse adjustment of the focus lens is conducted based on the value of the parameter, a fine adjustment of the focus lens is conducted based on said other than the value of the parameter.

3. The focus control apparatus according to claim 1, wherein, in conducting the focus control, said value other than the value of the parameter is the value of the second contrast signal.

4. The focus control apparatus according to claim 1, wherein, in conducting the focus control, switching to moving the focus lens based on the value other than the value of the parameter is made at a timing at which the value of the parameter assumes the peak.

5. The focus control apparatus according to claim 4, wherein, in conducting the focus control, the value other than the value of the parameter is the value of the second contrast signal.

6. The focus control apparatus according to claim 1, wherein, the focus control is conducted such that, after the focus lens is stopped at a timing at which the value of the parameter assumes the peak, the focus lens is moved based on a value other than the value of the parameter so that the focus lens stops at an in-focus position or a position in a proximity of the in-focus position.

7. The focus control apparatus according to claim 6, wherein, in conducting the focus control, said value other than the value of the parameter is the value of the second contrast signal.

8. The focus control apparatus according to claim 1, wherein the time difference corresponds two fields.

9. The focus control apparatus according to claim 1, wherein the controller sets the first and second cutoff frequencies on the basis of at least one of a zoom magnification and a travel velocity of the focus lens.

10. The focus control apparatus according to claim 9, wherein
    the controller comprises a table which prescribes relations between the zoom magnification and/or the travel velocity of the focus lens and the first and second cutoff frequencies, and
    the controller reads out the first and second cutoff frequencies depending upon the zoom magnification and/or the travel velocity of the focus lens from the table, and sets the first and second cutoff frequencies in the first and second contrast signal generators, respectively.

11. A focus control method for exercising focus control in an image pickup apparatus, the focus control method comprising:
    a first step of extracting a first high frequency component depending upon a first cutoff frequency from a video signal, generating a first contrast signal of the video signal on the basis of the extracted first high frequency component, extracting a second high frequency component depending upon a second cutoff frequency which is higher than the first cutoff frequency from the video signal, and generating a second contrast signal of the video signal on the basis of the extracted second high frequency component; and a second step of using a quotient obtained by dividing a value of the first contrast signal by a value of the second contrast signal as a parameter and exercising focus control on the basis of the parameter, wherein the first and second cutoff frequencies are set so as to cause a value of the parameter to assume a peak when a focus lens in the image pickup apparatus is located at positions a predetermined distance behind an in-focus position and decrease when the focus lens is located behind each peak, wherein the predetermined distance is a distance which takes account of an amount of travel of the focus lens during a time difference occurring until the focus control is started in the controller based on the parameter, and wherein the focus control is conducted such that, after the focus lens is moved based on the value of the parameter, the focus lens is moved based on a value other than the value of the parameter.

12. The focus control method according to claim 11, wherein the focus control is conducted such that, after a coarse adjustment of the focus lens is conducted based on the value of the parameter, a fine adjustment of the focus lens is conducted based on the value other than the value of the parameter.

13. The focus control method according to claim 11, wherein, in conducting the focus control, the value other than the value of the parameter is the value of the second contrast signal.

14. The focus control method according to claim 11, wherein, the focus control includes switching to moving the focus lens based on the value other than the value of the parameter at a timing at which the value of the parameter assumes the peak.

15. The focus control method according to claim 14, wherein, in conducting the focus control, the value other than the value of the parameter is the value of the second contrast signal.

16. The focus control method according to claim 11, wherein, the focus control is conducted such that, after the focus lens is stopped at a timing at which the value of the parameter assumes the peak, the focus lens is moved based on a value other than the value of the parameter so that the focus lens stops at an in-focus position or a position in a proximity of the in-focus position.

17. The focus control method according to claim 16, wherein, in conducting the focus control, the value other than the value of the parameter is the value of the second contrast signal.

18. The focus control apparatus according to claim 11, wherein the time difference corresponds two fields.

19. The focus control method according to claim 11, wherein at the second step, the first and second cutoff frequencies are set on the basis of at least one of a zoom magnification and a travel velocity of the focus lens.

20. The focus control method according to claim 19, comprising:

preparing a table which prescribes relations between the zoom magnification and/or the travel velocity of the focus lens and the first and second cutoff frequencies, and reading out the first and second cutoff frequencies depending upon the zoom magnification and/or the travel velocity of the focus lens from the table, and setting as cutoff frequencies to be used when extracting the first and second high frequency components, respectively.

* * * * *